(12) United States Patent
Xu

(10) Patent No.: US 11,792,258 B1
(45) Date of Patent: Oct. 17, 2023

(54) FILE TRANSMISSION METHOD AND APPARATUS, DEVICE, AND STORAGE MEDIUM

(71) Applicant: INSPUR SUZHOU INTELLIGENT TECHNOLOGY CO., LTD., Jiangsu (CN)

(72) Inventor: Ruqing Xu, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/033,460

(22) PCT Filed: Dec. 30, 2021

(86) PCT No.: PCT/CN2021/143263
§ 371 (c)(1),
(2) Date: Apr. 24, 2023

(87) PCT Pub. No.: WO2022/148299
PCT Pub. Date: Jul. 14, 2022

(30) Foreign Application Priority Data

Jan. 7, 2021 (CN) .......................... 202110018431.0

(51) Int. Cl.
*H04L 67/00* (2022.01)
*H04L 67/06* (2022.01)
(Continued)

(52) U.S. Cl.
CPC .......... *H04L 67/06* (2013.01); *H04L 43/0876* (2013.01); *H04W 28/22* (2013.01)

(58) Field of Classification Search
None
See application file for complete search history.

(56) References Cited

U.S. PATENT DOCUMENTS 10,489,249 B2 * 11/2019 Bangalore ............. G06F 16/156
11,308,035 B2 * 4/2022 Prahlad ................. G06F 16/122
(Continued)

FOREIGN PATENT DOCUMENTS

CN         1402550 A     3/2003
CN      101997916 A     3/2011
(Continued)

*Primary Examiner* — Gerald A Smarth
(74) *Attorney, Agent, or Firm* — IPRO, PLLC

(57) ABSTRACT

The present application discloses a file transmission method and apparatus, a device, and a storage medium. The steps of the method include: counting the number of target files transmitted in a transmission channel; obtaining a preset peak transmission rate of the transmission channel, the preset peak transmission rate being less than or equal to the rated maximum transmission rate of the transmission channel; calculating an average rate on the basis of the number of files and the preset peak transmission rate; adjusting the transmission rate of each of the target files in the transmission channel to be the average rate; and transmitting the target files in the transmission channel. The present method relatively ensures the stability of the operation of a server during file transmission. In addition, the present application also provides a file transmission apparatus, a device, and a storage medium, which have the same beneficial effects as those described above.

20 Claims, 3 Drawing Sheets

(51) Int. Cl.
*H04W 28/22* (2009.01)
*H04L 43/0876* (2022.01)

(56) References Cited

U.S. PATENT DOCUMENTS

| | | |
|---|---|---|
| 2009/0287844 A1 | 11/2009 | Bailey |
| 2011/0047287 A1* | 2/2011 | Harrang .................. H04L 45/00 |
| | | 713/340 |
| 2011/0131319 A1* | 6/2011 | Harrang .................. H04L 47/12 |
| | | 709/224 |
| 2016/0366108 A1 | 12/2016 | Kamble |
| 2019/0166186 A1* | 5/2019 | Choi ..................... H04L 65/611 |

FOREIGN PATENT DOCUMENTS

| | | | |
|---|---|---|---|
| CN | 105871986 A | 8/2016 | |
| CN | 106231440 A | 12/2016 | |
| CN | 109981732 A | 7/2019 | |
| CN | 110109884 A | 8/2019 | |
| CN | 110620795 A | 12/2019 | |
| CN | 110620807 A | 12/2019 | |
| CN | 110650546 A | 1/2020 | |
| CN | 111338780 A | 6/2020 | |
| CN | 112738270 A | 4/2021 | |
| EP | 0512174 A1 | 11/1992 | |
| WO | WO-0154370 A2 * | 7/2001 | ............ H04L 29/06 |
| WO | 2011006834 A1 | 1/2011 | |

* cited by examiner

FILE TRANSMISSION METHOD AND APPARATUS, DEVICE, AND STORAGE MEDIUM

CROSS-REFERENCE TO RELATED APPLICATION

The present disclosure claims priority to Chinese patent application No. 202110018431.0, titled "FILE TRANSMISSION METHOD AND APPARATUS, DEVICE, AND STORAGE MEDIUM", filed on Jan. 7, 2021 before the CNIPA, China National Intellectual Property Administration, which is incorporated herein in its entirety by reference.

TECHNICAL FIELD

The present disclosure relates to the field of computer communications, in particular to a file transmission method and apparatus, a device, and a storage medium.

BACKGROUND

Artificial intelligence (AI) is a technique to simulate human cognitive abilities by machines, and is a new technical science to study and develop theories, methods, techniques, and application systems for simulating, extending, and expanding human intelligence.

AI is implemented by using data set files with specific data features as sample data to train a model capable of identifying such features, thus a large number of data set files are generally necessary as a basis for model training. In other words, for the task of model training in an AI scenario, the importance of transmission of the data set files is self-evident. However, in the process of file transmission, the computing and communication resources of a server are generally occupied, and given that the resources of the server are generally limited, it is currently difficult to ensure the stability of the server running in the process of file transmission.

Therefore, it is a problem to be solved by those skilled in the art to provide a file transmission method that may ensure the stability of the server running in the process of file transmission.

SUMMARY

It is an object of the present disclosure to provide a file transmission method and apparatus, a device, and a storage medium.

In view of the above problem, the present disclosure provides a file transmission method, including:
  counting a number of target files transmitted in a transmission channel;
  acquiring a preset peak transmission rate of the transmission channel, and the preset peak transmission rate is less than or equal to a rated maximum transmission rate of the transmission channel;
  calculating an average rate according to the number of the target files and the preset peak transmission rate;
  adjusting a transmission rate of each of the target files in the transmission channel to be the average rate; and
  transmitting the target files in the transmission channel.

In some embodiments, the transmitting the target files in the transmission channel includes:
  transmitting each of the target files in units of data blocks in the transmission channel.

In some embodiments, the transmitting each of the target files in units of data blocks in the transmission channel includes:
  counting a target data volume corresponding to a data block of an untransmitted portion in the target file;
  determining whether the target data volume is less than or equal to a preset data capacity; and
  transmitting the target file in the transmission channel in units of data blocks of the untransmitted portion of the target file in response to determining that the target data volume is less than or equal to the preset data capacity.

In some embodiments, in response to determining that the target data volume is greater than the preset data capacity, the method further includes:
  dividing the data block of the untransmitted portion in the target file into sub-data blocks that are less than or equal to the preset data capacity; and
  transmitting the target file in units of sub-data blocks.

In some embodiments, before counting the number of the target files transmitted in the transmission channel, the method further includes:
  determining whether the number of the target files in the transmission channel changes;
  performing the step of counting the number of the target files transmitted in the transmission channel in response to determining that the number of the target files in the transmission channel changes.

Further, the present application provides a file transmission apparatus, including:
  a counting module, configured to count a number of target files transmitted in a transmission channel;
  a peak rate acquisition module, configured to acquire a preset peak transmission rate of the transmission channel, and the preset peak transmission rate is less than or equal to a rated maximum transmission rate of the transmission channel;
  an average rate calculation module, configured to calculate an average rate according to the number of the target files and the preset peak transmission rate;
  a rate adjustment module, configured to adjust a transmission rate of each of the target files in the transmission channel to be the average rate; and
  a channel transmission module, configured to transmit the target files in the transmission channel.

In some embodiments, the channel transmission module includes:
  a data block transmission module, configured to transmit the target file in units of data blocks in the transmission channel.

In some embodiments, the data block transmission module includes:
  a data volume counting module, configured to count a target data volume corresponding to a data block of an untransmitted portion in the target file;
  a capacity determination module, configured to: determine whether the target data volume is less than or equal to a preset data capacity; and invoke a transmission sub-module in response to determining that the target data volume is less than or equal to the preset data capacity;
  the transmission sub-module is configured to transmit the target file in the transmission channel in units of the data blocks of the untransmitted portion of the target file.

Further, the present application provides a file transmission device, including:
   a memory for storing a computer program; and
   a processor for implementing steps of the file transmission method described above.

Further, the present application provides a computer-readable storage medium storing a computer program that, when executed by a processor, causes the processor to perform steps of the file transmission method described above.

BRIEF DESCRIPTION OF THE DRAWINGS

To illustrate the embodiments of the present disclosure more clearly, a brief description will be given below of the drawings which need to be used in the embodiments. Apparently, the drawings in the following description are only some rather than all of the embodiments of the present disclosure, and those skilled in the art may obtain other drawings according to these drawings without paying any creative effort.

DETAILED DESCRIPTION

The embodiments of the present disclosure will be described more fully hereinafter with reference to the accompanying drawings, in which some, but not all embodiments of the present disclosure are shown. Based on the embodiments in the present disclosure, all the other embodiments obtained by those skilled in the art without paying any creative effort shall fall within the scope of the present disclosure.

AI is implemented by using data set files with specific data features as sample data to train a model capable of identifying such features, thus a large number of data set files are generally necessary as a basis for model training. In other words, for the task of model training in an AI scenario, the importance of transmission of the data set files is self-evident. However, in the process of file transmission, the computing and communication resources of a server are generally occupied, and given that the resources of the server are generally limited, it is currently difficult to ensure the stability of the server running in the process of file transmission.

In view of the above, the core of the present disclosure is to provide a file transmission method that may ensure the stability of the server running in the process of file transmission.

In order that those skilled in the art may better understand the solutions of the present disclosure, a further detailed description in connection with the accompanying drawings and detailed description is given below.

Figure 1:
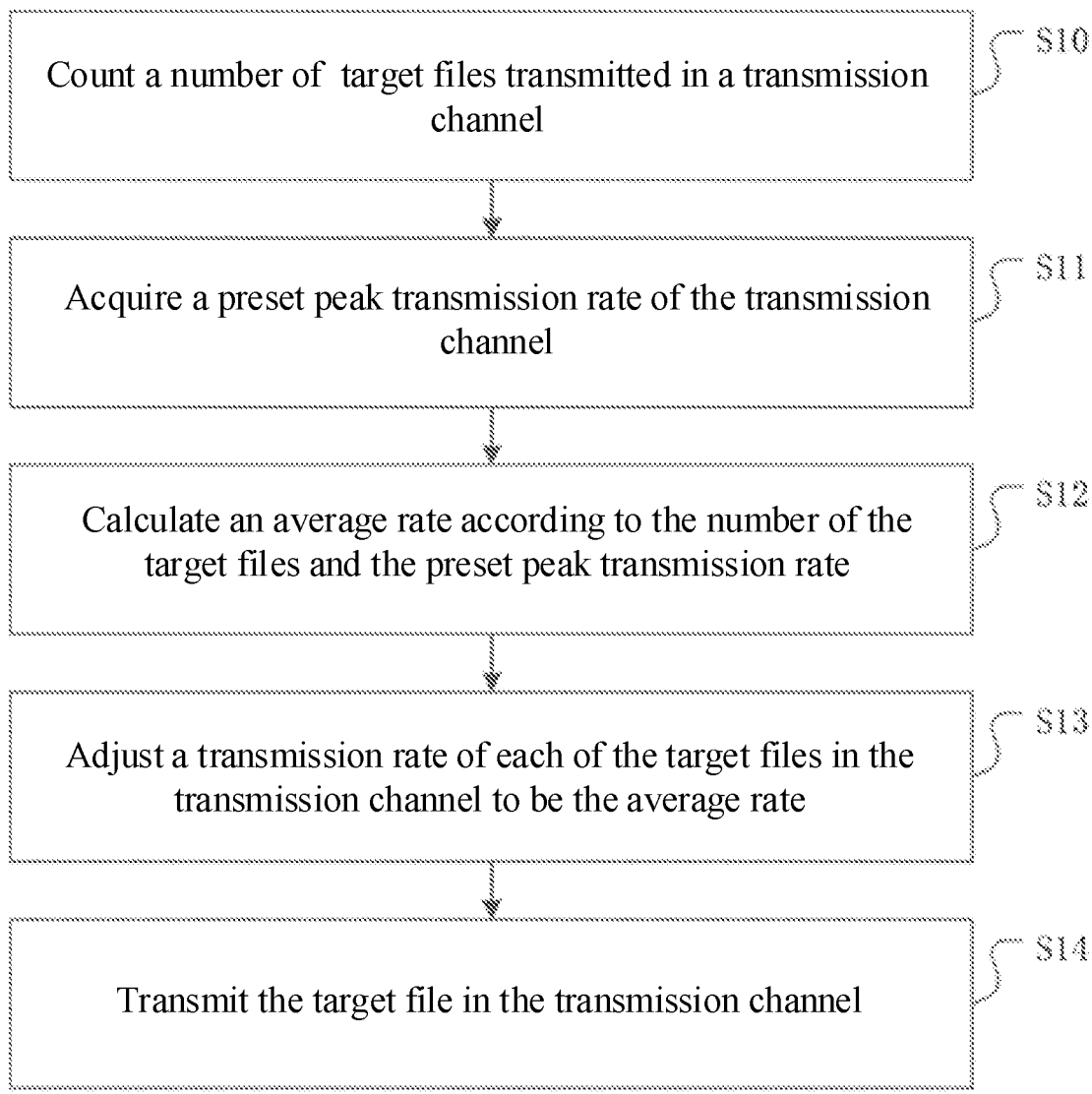
FIG. 1 is a flowchart of a file transmission method provided by an embodiment of the present disclosure.

With reference to FIG. 1, an embodiment of the present disclosure discloses a file transmission method including steps described below.

In step S10, a number of target files transmitted in a transmission channel is counted.

It should be noted that the target file in the present embodiment refers to a file requiring to be subjected to file transmission, and the file in the present embodiment refers to a set composed of data. The type of the file may be a data set file used for model training in an AI scenario, or may be a file uploaded to a cloud to be backed up during cloud backup, etc, which should be determined according to the actual transmission scenario, and is not particularly limited herein.

In this step, to perform file transmission, the number of the target files transmitted in the transmission channel is first counted, so that the resource consumption of each target file in the transmission channel is allocated according to the number of the target files in the subsequent step.

In step S11, a preset peak transmission rate of the transmission channel is acquired.

Herein, the preset peak transmission rate is less than or equal to a rated maximum transmission rate of the transmission channel.

After counting the number of the target files transmitted in the transmission channel, the preset peak transmission rate of the transmission channel is further acquired in this step. The preset peak transmission rate in this step refers to a maximum rate, as defined artificially, allowed for the data transmission in the transmission channel, and the rated maximum transmission rate refers to a maximum transmission rate that can be theoretically achieved by the transmission channel under the joint influence by the communication resources and the computation resources in a server device. The essence of this embodiment is that the preset peak transmission rate is less than or equal to the rated maximum transmission rate of the transmission channel, so as to avoid excessive consumption of the communication resources and the computation resources in the server device when transmitting files in the transmission channel, thereby ensuring the stable operation of the server device.

In step S12, an average rate is calculated according to the number of the target files and the preset peak transmission rate.

After counting the number of the target files transmitted in the transmission channel and acquiring the preset peak transmission rate of the transmission channel, the average rate is further calculated according to the file number and the preset peak transmission rate in this step. The average rate is obtained by dividing the preset peak transmission rate by the number of the target files, and represents the transmission rate allocated to each target file in the case where the preset peak transmission rate is equally allocated to each target file.

In step S13, a transmission rate of each of the target files in the transmission channel is adjusted to be the average rate.

After calculating the average rate according to the number of the target files and the preset peak transmission rate, the transmission rate of the target file in the transmission channel is further adjusted to be the average rate in this step, so as to enable each target file in the transmission channel to equally share the transmission rate of the transmission channel.

In step S14, the target files are transmitted in the transmission channel.

After adjusting the transmission rate of the target file in the transmission channel to be the average rate, the target files are further transmitted in the transmission channel on the basis of the average rate occupied by each target file in the transmission channel in the step. The present embodiment achieves the technical object of dynamically adjusting, according to the total number of the target files, the transmission rate adopted during transmitting the target files.

The file transmission method provided in the present disclosure includes: counting a number of target files transmitted in a transmission channel; acquiring a preset peak transmission rate of the transmission channel, where the preset peak transmission rate is less than or equal to a rated maximum transmission rate of the transmission channel; calculating an average rate according to the number of the target files and the preset peak transmission rate; adjusting the transmission rate of each of the target files in the transmission channel to be the average rate; and transmitting the target files in the transmission channel. In the method, a maximum transmission rate of the transmission channel in the process of transmitting data is preset, that is, a preset peak transmission rate is provided, and the preset peak transmission rate is less than or equal to the rated maximum transmission rate of the transmission channel; in this case, the preset peak transmission rate of the transmission channel is then evenly distributed to the target files for occupation, thereby relatively ensuring that the resources consumption during the transmission of the target files are controllable as a whole and may not exceed the rated maximum resources of the server; therefore, the stability of the server running during the process of file transmission is ensured to an extent.

On the basis of the above embodiment, as an alternative embodiment, each of the target files is transmitted in the transmission channel as follows:

transmitting the target file in units of data blocks in the transmission channel.

It should be noted that in the present embodiment, the target file is transmitted in the transmission channel specifically by using a data block as a transmission unit of the target file, that is, the target file is divided into data blocks, and the data blocks are transmitted block by block through the transmission channel, thereby achieving the purpose of transmitting the target file in the transmission channel. This embodiment further improves the controllability of the process of transmitting the target file.

Figure 2:
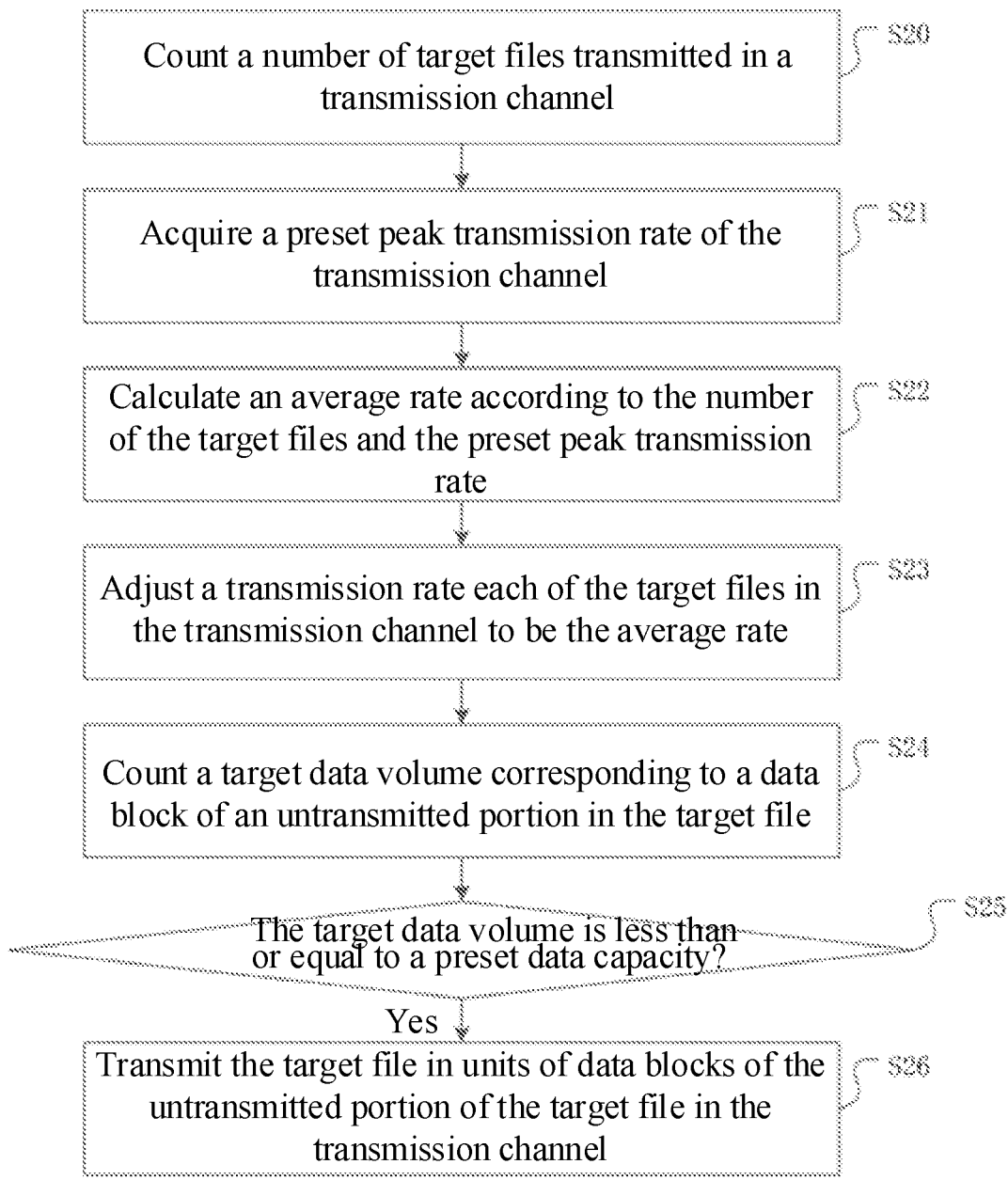
FIG. 2 is a flowchart of a specific file transmission method provided by an embodiment of the present disclosure.

With reference to FIG. 2, an embodiment of the present disclosure discloses a file transmission method including steps described below.

In step S20, a number of target files transmitted in a transmission channel is counted.

In step S21, a preset peak transmission rate of the transmission channel is acquired.

The preset peak transmission rate is less than or equal to a rated maximum transmission rate of the transmission channel.

In step S22, an average rate is calculated according to the number of the target files and the preset peak transmission rate.

In step S23, a transmission rate of each of the target files in the transmission channel is adjusted to be the average rate.

In step S24, a target data volume corresponding to a data block of an untransmitted portion in the target file is counted In step S25, it is determined whether the target data volume is less than or equal to a preset data capacity, and the method proceeds to step S26 if the target data volume is less than or equal to the preset data capacity.

In step S26, the target file is transmitted, in units of data blocks of the untransmitted portion in the target file, in the transmission channel.

The purpose of adjusting the transmission rate of the target file in the transmission channel to be the average rate is to continue the transmission of data content with the target file as a to-be-transmitted part in the transmission channel at the average rate, hence in the process of transmitting the target file in the transmission channel in units of data blocks, the target data volume corresponding to the data block of the untransmitted portion in the target file is counted first, and then a determination is made as to whether the target data volume is less than or equal to the preset data capacity, that is, whether the data volume of the data blocks in the target file is less than or equal to the data volume of the data blocks that can be transmitted in the transmission channel per unit time. This is done to determine whether the data blocks of the target file can be directly transmitted, and when the target data volume is less than or equal to the preset data capacity, that is, the data volume of the data blocks in the target file is less than or equal to the data volume of the data blocks that can be transmitted in the transmission channel per unit time, the target file is transmitted in the transmission channel in units of data blocks of the un-transmitted portion in the target file. This embodiment further ensures the reliability of the transmission of the target file in units of data block in the transmission channel.

On the basis of the above-mentioned embodiments, as an alternative embodiment, when the target data volume is greater than the preset data capacity, the method further includes:

dividing the data block of the untransmitted portion in the target file into sub-data blocks that are less than or equal to the preset data capacity; and transmitting the target file in units of sub-data blocks.

It should be noted that, in this embodiment, when a determination result as to whether the target data volume is less than or equal to the preset data capacity is negative, that is, when the target data volume is greater than the preset data capacity, this embodiment further divides the data block of the untransmitted portion of the target file into sub-data blocks that are less than or equal to the preset data capacity, and transmits the target file in units of sub-data blocks. The present embodiment ensures the reliability of transmitting a target file in units of data blocks in the transmission channel when the target data volume corresponding to the data blocks of the untransmitted portion in the target file is greater than the preset data capacity.

On the basis of the series of embodiments described above, as an alternative embodiment, before the number of the target files transmitted in the transmission channel is counted, the method further includes:

determining whether the number of the target files in the transmission channel changes; and if so, performing the step of counting the number of the target files transmitted in the transmission channel.

It should be noted that in this embodiment, before counting the number of the target files transmitted in the transmission channel, it is determined whether the number of the target files in the transmission channel changes, and then the transmission rate occupied by the target files in the transmission channel is dynamically adjusted when the number of the target files in the transmission channel changes, thereby further ensuring the stability of the operation of the server during file transmission.

Figure 3:
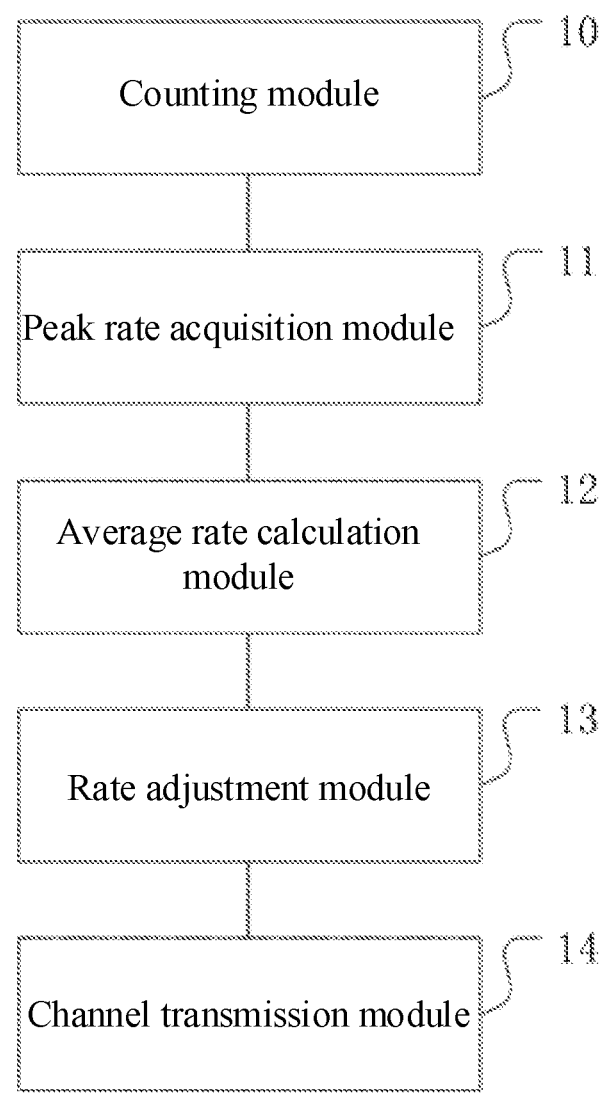
FIG. 3 is a schematic diagram illustrating a configuration of a file transmission apparatus provided by an embodiment of the present disclosure.

With reference to FIG. 3, an embodiment of the present disclosure provides a file transmission apparatus, including a counting module 10, a peak rate acquisition module 11, an average rate calculation module 12, a rate adjustment module 13 and a channel transmission module 14.

The counting module 10 is configured to count a number of target files transmitted in a transmission channel.

The peak rate acquisition module 11 is configured to acquire a preset peak transmission rate of the transmission channel, and the preset peak transmission rate is less than or equal to a rated maximum transmission rate of the transmission channel.

The average rate calculation module 12 is configured to calculate an average rate according to the number of the target files and the preset peak transmission rate.

The rate adjustment module 13 is configured to adjust a transmission rate of each of the target files in the transmission channel to be the average rate.

The channel transmission module 14 is configured to transmit the target files in the transmission channel.

On the basis of the above-mentioned embodiment, as an alternative embodiment, the channel transmission module 14 includes:

a data block transmission module, configured to transmit the target files in units of data blocks in the transmission channel.

On the basis of the above-mentioned embodiment, as an alternative embodiment, the data block transmission module includes a data volume counting module, a capacity determination module and a transmission sub-module.

The data volume counting module is configured to count a target data volume corresponding to data a block of an untransmitted portion in the target file.

The capacity determination module is configured to: determine whether the target data volume is less than or equal to a preset data capacity; and invoke the transmission sub-module if the target data volume is less than or equal to the preset data capacity.

The transmission sub-module is configured to transmit the target file in the transmission channel in units of data blocks of the untransmitted portion of the target file.

The file transmission apparatus provided in the present disclosure is configured to: count a number of target files transmitted in a transmission channel first; acquire a preset peak transmission rate of the transmission channel, where the preset peak transmission rate is less than or equal to a rated maximum transmission rate of the transmission channel; calculate an average rate according to the number of the target files and the preset peak transmission rate; adjust a transmission rate of each of the target files in the transmission channel to be the average rate; and transmit the target files in the transmission channel. In the apparatus, a maximum transmission rate of the transmission channel in the process of transmitting data is preset, that is, a preset peak transmission rate is provided, and the preset peak transmission rate is less than or equal to the rated maximum transmission rate of the transmission channel; in this case, the preset peak transmission rate of the transmission channel is then evenly distributed to the target files for occupation, thereby relatively ensuring that the resource consumption during the transmission of the target files is controllable as a whole and may not exceed the rated maximum resources of the server; therefore, the stability of the server running during the process of file transmission is ensured to an extent.

Furthermore, the present disclosure further provides a file transmission device, including:

a memory for storing a computer program; and a processor for executing steps of the file transmission method as described above when executing the computer program.

The file transmission device provided in the present disclosure is configured to: count a number of target files transmitted in a transmission channel first; acquire a preset peak transmission rate of the transmission channel, where the preset peak transmission rate is less than or equal to a rated maximum transmission rate of the transmission channel; calculate an average rate according to the number of the target files and the preset peak transmission rate; adjust a transmission rate of each of the target files in the transmission channel to be the average rate; and transmit the target files in the transmission channel. In the device, a maximum transmission rate of the transmission channel in the process of transmitting data is preset, that is, a preset peak transmission rate is provided, and the preset peak transmission rate is less than or equal to the rated maximum transmission rate of the transmission channel; in this case, the preset peak transmission rate of the transmission channel is then evenly distributed to the target files for occupation, thereby relatively ensuring that the resource consumption during the transmission of the target files is controllable as a whole and may not exceed the rated maximum resources of the server; therefore, the stability of the server running during the process of file transmission is ensured to an extent.

Furthermore, the present disclosure further provides a computer-readable storage medium storing a computer program that, when executed by a processor, implements the steps of the file transmission method as described above.

According to the computer-readable storage medium provided in the present disclosure, a number of target files transmitted in a transmission channel is counted first; a preset peak transmission rate of the transmission channel is acquired, where the preset peak transmission rate is less than or equal to a rated maximum transmission rate of the transmission channel; an average rate is calculated according to the number of the target files and the preset peak transmission rate; a transmission rate of each of the target files in the transmission channel is adjusted to be the average rate; and the target files are transmitted in the transmission channel. In the computer-readable storage medium, a maximum transmission rate of the transmission channel in the process of transmitting data is preset, that is, a preset peak transmission rate is provided, and the preset peak transmission rate is less than or equal to the rated maximum transmission rate of the transmission channel; in this case, the preset peak transmission rate of the transmission channel is then evenly distributed to the target files for occupation, thereby relatively ensuring that the resources consumption during the transmission of the target file are controllable as a whole and may not exceed the rated maximum resources of the server; therefore, the stability of the server running during the process of file transmission is ensured to an extent.

The file transmission method, the file transmission apparatus, the file transmission device and the storage medium provided by the present application have been introduced in detail above. Various embodiments in the description are described in a progressive manner, each embodiment focuses on the difference from other embodiments, and the same and similar parts of various embodiments can be referred to each other. Since the device disclosed in the embodiments corresponds to the method disclosed in the embodiments, the description of the device is relatively simple, for the related information, please refer to the description of the method embodiments. It should be noted that those skilled in the art can make some improvements and modifications to the application without departing from the principles of the application, and these improvements and modifications also fall within the protection scope of the claims of the application.

It should be noted that, in the present specification, relationship terms such as first and second are only used to distinguish one entity or operation from another entity or operation, and do not necessarily require or imply any such actual relationship or sequence exists between these entities or operations. The terms "comprising", "including" or any other variation thereof are intended to encompass non-exclusive inclusion such that a process, method, article or device including a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

The invention claimed is:

1. A file transmission method, comprising:
   counting a number of target files transmitted in a transmission channel;
   acquiring a preset peak transmission rate of the transmission channel, wherein the preset peak transmission rate is less than or equal to a rated maximum transmission rate of the transmission channel;
   calculating an average rate according to the number of the target files and the preset peak transmission rate;
   adjusting a transmission rate of each of the target files in the transmission channel to be the average rate; and
   transmitting the target files in the transmission channel, wherein during transmitting the target files in the transmission channel, determining whether the number of the target files in the transmission channel changes;
   performing the step of counting the number of the target files transmitted in the transmission channel in response to determining that the number of the target files in the transmission channel changes.

2. The file transmission method according to claim 1, wherein the transmitting the target files in the transmission channel comprises:
   transmitting each of the target files in units of data blocks in the transmission channel.

3. The file transmission method according to claim 2, wherein the transmitting each of the target files in units of data blocks in the transmission channel comprises:
   counting a target data volume corresponding to a data block of an untransmitted portion in the target file;
   determining whether the target data volume is less than or equal to a preset data capacity; and
   transmitting the target file in the transmission channel in units of data blocks of the untransmitted portion of the target file in response to determining that the target data volume is less than or equal to the preset data capacity.

4. The file transmission method according to claim 3, wherein in response to determining that the target data volume is greater than the preset data capacity, the method further comprises:
   dividing the data block of the untransmitted portion in the target file into sub-data blocks that are less than or equal to the preset data capacity; and
   transmitting the target file in units of sub-data blocks.

5. The file transmission method according to claim 2, wherein the transmitting each of the target files in units of data blocks in the transmission channel comprises:
   dividing the target file into data blocks, and transmitting the data blocks block by block through the transmission channel.

6. The file transmission method according to claim 1, wherein the target file is a file requiring to be subjected to file transmission.

7. The file transmission method according to claim 1, wherein the preset peak transmission rate is a specified maximum rate allowed for the data transmission in the transmission channel, and the rated maximum transmission rate is a maximum transmission rate that is theoretically achievable by the transmission channel.

8. The file transmission method according to claim 1, wherein the calculating an average rate according to the number of the target files and the preset peak transmission rate comprises: obtaining the average rate by dividing the preset peak transmission rate by the number of the target files.

9. The file transmission method according to claim 1, wherein the average rate represents the transmission rate allocated to each of the target files when the preset peak transmission rate is equally allocated to each of the target files.

10. A file transmission device, comprising:
    a memory for storing a computer program; and
    a processor,
    wherein the computer program, when executed by the processor, causes the processor to perform operations of:
    counting a number of target files transmitted in a transmission channel;
    acquiring a preset peak transmission rate of the transmission channel, wherein the preset peak transmission rate is less than or equal to a rated maximum transmission rate of the transmission channel;
    calculating an average rate according to the number of the target files and the preset peak transmission rate;
    adjusting a transmission rate of each of the target files in the transmission channel to be the average rate; and
    transmitting the target files in the transmission channel,
    wherein the processor is further configured to perform operations of:
    determining whether the number of the target files in the transmission channel changes before counting the number of the target files transmitted in the transmission channel; and
    performing the counting the number of the target files transmitted in the transmission channel in response to determining that the number of the target files in the transmission channel changes.

11. The file transmission device according to claim 10, wherein the processor is further configured to perform operations of:
    transmitting each of the target files in units of data blocks in the transmission channel.

12. The file transmission device according to claim 11, wherein the processor is further configured to perform operations of:
    counting a target data volume corresponding to a data block of an untransmitted portion in the target file;
    determining whether the target data volume is less than or equal to a preset data capacity; and
    transmitting the target file in the transmission channel in units of data blocks of the untransmitted portion of the target file in response to determining that the target data volume is less than or equal to the preset data capacity.

13. The file transmission device according to claim 12, wherein in response to determining that the target data volume is greater than the preset data capacity, the processor is further configured to perform operations of:
    dividing the data block of the untransmitted portion in the target file into sub-data blocks that are less than or equal to the preset data capacity; and
    transmitting the target file in units of sub-data blocks.

14. The file transmission device according to claim 11, wherein the processor is further configured to perform operations of:

dividing the target file into data blocks, and transmitting the data blocks block by block through the transmission channel.

15. The file transmission device according to claim 10, wherein the target file is a file requiring to be subjected to file transmission.

16. The file transmission device according to claim 10, wherein the preset peak transmission rate is a specified maximum rate allowed for the data transmission in the transmission channel, and the rated maximum transmission rate is a maximum transmission rate that is theoretically achievable by the transmission channel.

17. The file transmission device according to claim 10, wherein the processor is further configured to perform operations of obtaining the average rate by dividing the preset peak transmission rate by the number of the target files.

18. The file transmission device according to claim 10, wherein the average rate represents the transmission rate allocated to each of the target files when the preset peak transmission rate is equally allocated to each of the target files.

19. A non-transient computer-readable storage medium, wherein the computer-readable storage medium is stored with a computer program that, when executed by a processor, causes the processor to perform operations of:

counting a number of target files transmitted in a transmission channel;

acquiring a preset peak transmission rate of the transmission channel, wherein the preset peak transmission rate is less than or equal to a rated maximum transmission rate of the transmission channel;

calculating an average rate according to the number of the target files and the preset peak transmission rate;

adjusting a transmission rate of each of the target files in the transmission channel to be the average rate; and transmitting the target files in the transmission channel, wherein the processor is further configured to perform operations of:

determining whether the number of the target files in the transmission channel changes before counting the number of the target files transmitted in the transmission channel; and performing the counting the number of the target files transmitted in the transmission channel in response to determining that the number of the target files in the transmission channel changes.

20. The non-transient computer-readable storage medium according to claim 19, wherein the processor is further configured to perform operations of:

transmitting each of the target files in units of data blocks in the transmission channel.

* * * * *